United States Patent [19]

Fovell et al.

[11] Patent Number: 4,960,569
[45] Date of Patent: Oct. 2, 1990

[54] CORONA DISCHARGE OZONATOR WITH COOLED FLOW PATH

[75] Inventors: Richard C. Fovell, San Jose; Jan M. Heinemann, San Lucis Obispo; Klaus W. Heinemann, Sunnyvale, all of Calif.

[73] Assignee: Alten Corporation, Palo Alto, Calif.

[21] Appl. No.: 271,030

[22] Filed: Nov. 14, 1988

[51] Int. Cl.$^5$ ............................................. B01J 19/08
[52] U.S. Cl. .......................... 422/186.19; 422/186.18; 422/186.07; 204/176
[58] Field of Search ............... 422/186.07, 186.18, 422/186.19, 186.2, 907; 204/176

[56] References Cited

U.S. PATENT DOCUMENTS

| | | | |
|---|---|---|---|
| 1,062,974 | 5/1913 | Hopkins | 422/186.19 |
| 1,709,813 | 4/1929 | Henry | 422/186.01 |
| 1,834,705 | 12/1931 | Hartman | 422/186.19 |
| 3,023,155 | 2/1962 | Castor | 422/186.18 |
| 3,421,999 | 1/1969 | Corwin | 422/186.15 |
| 4,213,838 | 7/1980 | Lowther | 204/176 |
| 4,417,966 | 11/1983 | Kauss et al. | 204/176 |
| 4,666,679 | 5/1987 | Masuda et al. | 422/186.2 |
| 4,693,870 | 9/1987 | Gloor et al. | 422/186.19 |
| 4,725,412 | 2/1988 | Ito | 422/186.19 |
| 4,774,061 | 9/1988 | Ahlbrandt | 422/186.05 |
| 4,774,062 | 9/1988 | Heinemann | 422/186.19 |
| 4,774,062 | 9/1988 | Heinemann | 422/186.19 |

Primary Examiner—Stephen J. Lechert, Jr.
Assistant Examiner—Nina Bhat
Attorney, Agent, or Firm—Majestic, Parson, Siebert & Hsue

[57] ABSTRACT

A corona discharge ozonator is provided that comprises a first electrode, a second electrode and a dielectric material disposed between the electrodes. An ozonization chamber is formed between one of the electrodes and the dielectric material and defines a fluid flow path. A plurality of thermally-conducting solids are within the fluid flow path. Substantially each of the solids touches another of the solids and either the dielectric material or the first or second electrode. These solids transfer heat from the hotter to the cooler of the dielectric and the first or second electrode when one of the electrodes is cooled by a conventional means such as a water bath. Corona discharge ozonators of the invention have improved ozone output and increased ozone production energy efficiency.

10 Claims, 2 Drawing Sheets

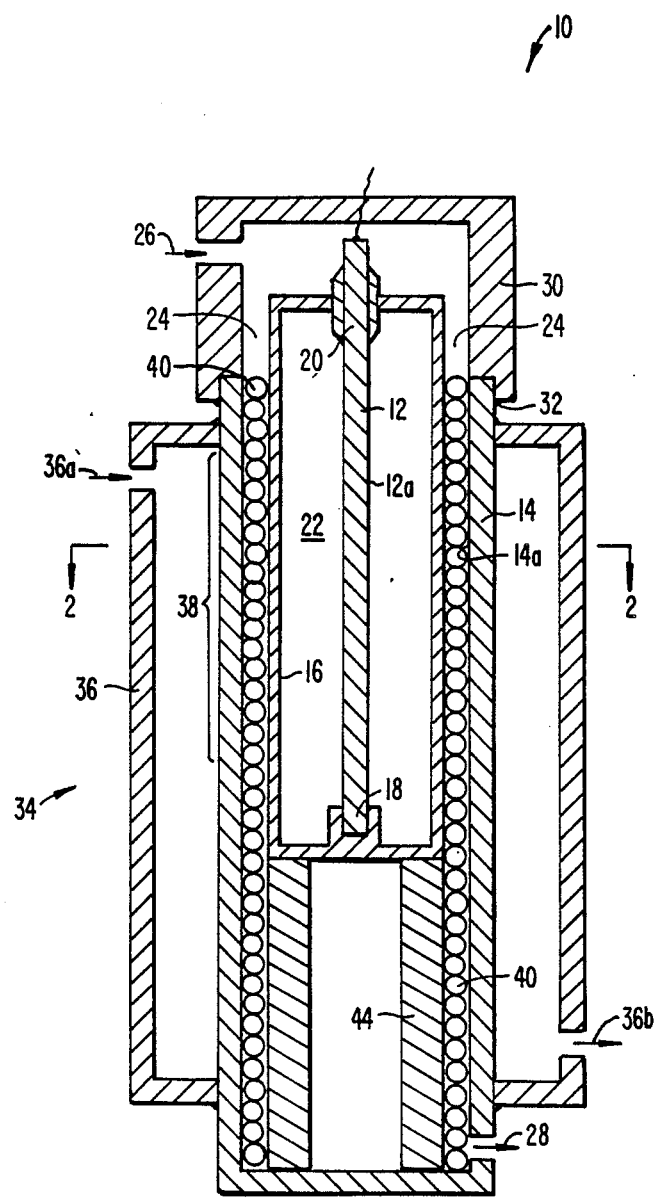
FIG._1.

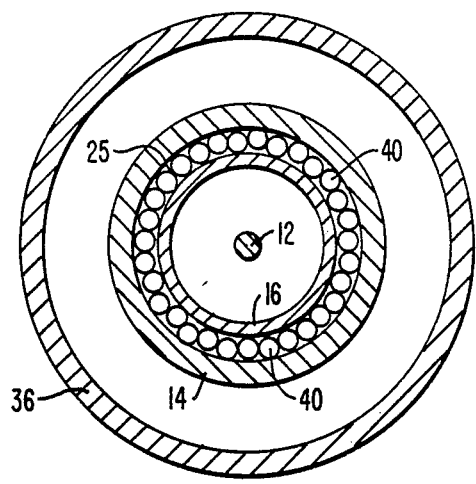
FIG._2.

CORONA DISCHARGE OZONATOR WITH COOLED FLOW PATH

FIELD OF THE INVENTION

The present invention generally relates to an apparatus by which a gas mixture containing molecular oxygen can be enriched with ozone, and more particularly relates to an ozonator operating on the corona discharge principle in which the fluid flow path is cooled for increased ozone production efficiency.

BACKGROUND OF THE INVENTION

Ozone is an excellent oxidizing agent and is highly destructive to many microorganisms, such as bacteria, fungi and algae. Thus, ozone has found uses in water purification, sterilization and deodorization. In many applications, ozone is more effective than chlorine, while the oxidation product of ozone is typically a harmless and environmentally acceptable gas, such as carbon-dioxide or water. However, the high cost and lack of long-term reliable ozone producing equipment has retarded the widespread use of ozone in many commercial applications.

Apparatus generating ozone are sometimes called "ozonators". In a typical corona discharge ozonator, the electrodes are made of aluminum, copper, steel or stainless steel. The dielectric is usually glass, titanium dioxide or alumina, and is either attached to one of the electrodes or positions in close proximity to it.

U.S. Pat. No. 4,417,966, issued Nov. 29, 1983, inventors Krauss, et al discloses a typical corona discharge ozonator where conventional cooling by means of air or water is suggested. The known, or conventional, cooling of such a corona discharge ozonator is to water-cool one of the two electrodes. The other electrode is usually difficult to cool because it is on high electric potential, but some cooling is achieved by convection using the air being ozonated in the gap, and by radiation through the gap. Both are very inefficient cooling mechanisms, especially in view of the fact that ozone is known to recombine to diatomic oxygen at a quickly increasing rate with increasing temperature.

U.S. Pat. No. 4,213,838, issued July 22, 1980, inventor Lowther, describes a corona discharge ozonator where the heat generated by corona discharge is said to be removed by the gas flow itself in a high rate of gas flow. This gas flow is conducted at a rate such that the pressure drop over the gas flow path is maintained between 0.1 and 2.0 pounds/inch$^2$, the flow path is between 2 and 10 inches in length, and a gap is between 0.01 and 0.25 inch.

European Patent Application publication number 160,964, published Nov. 13, 1985, inventor Masuda, discloses a corona discharge ozonator in which the gas being flowed is pressurized and cooled to make the density of the gas higher than that in the standard state. A cooling device comprises cooling fins on the outer periphery of the feed pipe, as well as on the outer peripheral surface of the cylindrical dielectric.

U.S. Pat. No. 4,774,061, issued Sept. 27, 1988, inventor Ahlbrandt, discloses an open station corona treating system for treating the surface of sheet materials by electric brush discharge. A brush electrode is cooled by air during the treatment process.

However, temperatures of any component in the airstream being flowed through the ozonator above about 120°–150° F. (about 49°–66° C.) are prohibitive, and at such relatively low temperatures and temperature differentials the conventional convection and radiation cooling is not very effective. The discharge energy intensities that can be drawn are thus limited, and the ozonators become bulky and expensive. Accordingly, there is a need for corona discharge ozonators with better cooling for improved ozone output to reduce the cost per unit ozone production.

SUMMARY OF THE INVENTION

In one aspect of the present invention, a corona discharge ozonator is provided comprising first and second electrodes connectable to an electrical power source with a dielectric material disposed between the electrodes. An ozonization chamber is formed between one of the electrodes and the dielectric material and defines a fluid flow path where ozone is produced during operation of the ozonator. A heat transfer means is disposed within the ozonization chamber for transferring heat from one of the dielectric material and the first or second electrode to the other during operation.

The heat transfer means preferably contacts the first or second electrode and the dielectric material at a plurality of points along the fluid flow path, and may include a plurality of thermally-conducting solids within the fluid flow path with substantially each of the solids touching another of the solids and either the dielectric material or the first or second electrode.

Use of the heat transfer means has been found to improve the ozone output of an ozonator of a given size by a factor of greater than 2, while the ozone production energy efficiency is increased. Practice of the present invention thus reduces the cost per unit ozone production by a substantial margin. The heat transfer means transfers heat by direct conduction and greatly improved convection. The heat transfer means preferably additionally after-cools the ozonated airstream exiting the ozonization chamber to further decrease the rate of ozone decomposition.

BRIEF DESCRIPTION OF THE DRAWINGS IN THE DRAWINGS:

FIG. 1 is a longitudinal cross-section of a corona discharge ozonator embodiment of the invention; and FIG. 2 is a cross-sectional view taken along line 2—2 of FIG. 1.

DETAILED DESCRIPTION OF THE PREFERRED EMBODIMENTS

Referring to FIG. 1, a corona discharge ozonator 10 of the invention comprises an inner electrode 12 and an outer electrode 14. A dielectric material 16 is disposed between electrodes 12 and 14. Inner electrode 12 and outer electrode 14 are preferably substantially cylindrical and in a concentric relationship. Outer electrode 14 is made of an electrically conducting material, such as aluminum, steel or copper. Dielectric material 16 may be a cylindrical glass tube, preferably pore free borosilica glass, sealed at both ends. Inner electrode 12, made of a metal like tungsten or stainless steel, may be loosely supported at one end 18 of the dielectric material, or tube, 16 and fused to the other end 20 of the tube 16. Thus, the interior 22 of tube 16 is sealed and can contain an ionizable gas, while inner electrode 12 protrudes to the outside and can be connected, along with outer electrode 14, to an electrical power source (not shown) for operation of ozonator 10.

As will be understood, the dielectric material 16 could be carried on the surface 12a of inner electrode 12 or on the surface 14a of outer electrode 14 or carried on both such surfaces. As illustrated by FIGS. 1 and 2, the inner electrode 12 would typically be on the high electric potential and can, therefore, generally not be cooled by standard conductive cooling means. Thus it (and the dielectric material, or tube, 16) will become hotter than outer electrode 14 which can be cooled by conventional cooling means, such as watercooled. However, the opposite would be true if outer electrode 14 were on the high electric potential. Thus, inner and outer electrodes 12, 14 will sometimes be referred to as first and second electrodes with the second electrode concentric to and spaced from the first electrode, with the dielectric material 16 disposed between the electrodes, and with one of the dielectric material and the first or second electrode becoming hotter than the other during operation.

Outer electrode 14 is concentric to and spaced from inner electrode 12 so that an ozonization chamber 24 is formed between outer electrode 14 and the dielectric material 16. Turning to FIG. 2, the ozonization chamber 24 has an annular width 25 between surface 14a and dielectric material 16.

Returning to Fig. ozonization chamber 24 includes an inlet 26 and an outlet 28. Gas is introduced at inlet 26, flows through ozonization chamber 24, and exits as ozone enriched at outlet 28. That is, the ozonization chamber 24 defines a fluid flow path for gas being ozonated when a high voltage of several thousand volts at alternating current is applied to the inner electrode 12 and outer electrode 14.

A cap 30 may seal ozonator 10 at the inlet 26. Cap 30 is preferably made of electrically insulating material, such as polyvinylchloride, and has an airtight connection 32 with the outer electrode 14. Cap 30 preferably protrudes over the top portion of tube 16 in order to prevent arcing between electrodes 12 and 14.

Outer electrode 14 preferably includes cooling means 34 for cooling the outer electrode 14 during operation. As illustrated, cooling means 34 may be a water jacket 36 with water circulated between inlet 36a and outlet 36b.

An ozonator 10 of the invention must include means 38 for transferring heat from the hotter of the dielectric material and the first or second electrode to the cooler first or second electrode. As illustrated by FIG. 1, inner electrode 12 and dielectric material 16 are hotter and outer electrode 14 is cooler. The heat transfer means 38 is disposed within the ozonization chamber 24 and preferably contacts the outer electrode 14 (at surface 14a) and the dielectric material 16 at a plurality of points along the fluid flow path.

In one preferred embodiment (illustrated by FIGS. 1 and 2) the heat transfer means 38 includes a plurality of thermally-conducting solids 40 disposed within the fluid flow path. Substantially each of the solids 40 touches another of the solids and either the dielectric material 16 or the outer electrode 14. Solids 40 are formed of a thermally good conducting material, such as ozone-resistant metal, and as illustrated may take the form of spheres. Each of the spheres contacts another sphere (and usually several other spheres) and either the outer electrode 14 or the dielectric material 16. The spheres thus transfer heat by direct thermal conduction away from the hot dielectric material 16 (and inner electrode 12) and to the cooler outer electrode 14.

Experiments have shown there should be at least ten contact points formed by solids 40 with dielectric material 16 and outer electrode 14 per square inch along the fluid flow path. For example, where the ozonization chamber 24 has an annular width 25 equal to 0.21 inch and the solids 40 are spheres of about 3/16 inch diameter, then there will be about 14 contacts/square inch. It is believed desirable that there be no areas without such contacts greater than about 0.5 square inch in order to avoid the development of hot spots. When solids 40 are in the form of spheres, then the sphere diameter must be carefully chosen to be somewhat smaller than the fluid flow path width in order to assure that the tube 16 does not mechanically bind. Best conditions have been found with spheres of about 3/16 inch diameter (about 0.19 inch) and an annular width of the fluid flow path of about 0.21 inch. This 0.02 inch numerical difference between the width of the fluid flow path (0.21 inch) and the sphere diameter (0.19 inch) is a ratio of about 0.1. The ratio of fluid flow path width to sphere diameter will sometimes hereinafter be called the "sphere/flow path clearance ratio".

Although spheres are illustrated as solids 40, a variety of other shapes may be utilized. For example, polyhedrals (such as an icosahedron) or rod segments are suitable as solids 40. The size of such differentlyshaped solids 40 will tend to vary by the orientation of such solids 40 when packed into ozonization chamber 24.

Cylindrical rods, if selected as solids 40, preferably will have a length-to-diameter ratio of between about 1 and 10, and polyhedrals will preferably have a longest dimension about the same as the fluid flow path width 25.

Heat transfer means 38 may also take other forms than the plurality of solids 40. For example, heat transfer means 38 may include a sheet of corrugated metal (not illustrated) disposed within ozonization chamber 24 and touching the outer electrode 14 and the tube 16 through contact with the peaks and valleys of the corrugations. For another example of heat transfer means 38, a spring-like metal coil (not illustrated) can be placed inside ozonization chamber 24 to touch, by appropriate variation of the inner and outer winding diameters, outer electrode 14 and tube 16.

As illustrated by FIG. 1, outer electrode 14 is preferably longer than tube 16. Tube 16 may be positioned upon a spacer 44. Spacer 44 preferably has the same outer diameter as tube 16, and thus extends the fluid flow path of ozonization chamber 24. This extension of the fluid flow path before ozonated gas exits outlet 28 provides for additional cooling immediately after the ozonization process. Spacer 44 may have a length from a few inches to as much as about 24 inches when the length of tube 16 is about 2 feet to about 3 feet.

Operation of a particularly preferred embodiment and operation of a prior art, comparative ozonator will now be exemplified.

EXAMPLE

A particularly preferred ozonator 10 embodiment of the invention was built as illustrated by FIGS. 1 and 2. Relevant dimensions, particular materials, and operating conditions were as follows:

Outer diameter of the dielectric 16: 19 mm (0.748 inch);

Type of dielectric: Pyrex, low-pressure gas filled;

Inner electrode 18: 0.08 inch O.D. metal, sealed to dielectric;

Length of ozonization chamber 24: 24 inch;
Diameter of the spheres 40 (Test A): 3/16 inch (0.188 inch);
Material of spheres 40 (Test A): Steel, metal coated;
Inner diameter of outer electrode 14 (Test A): 1.152 inch;
Inner diameter of outer electrode 14 (Test B): 0.938 inch;
The outer electrode 14 was water-cooled;
An AC frequency of 400 cps was applied between the electrodes;
The outer electrode 14 was grounded;
The input power consumption was measured and phase-corrected;
The ozone output was measured with a UV-absorption instrument.

Test A pertains to an embodiment using the cooling means subject to this invention; Test B describes experiments performed with an ozonator not having these cooling means under otherwise identical or comparable conditions. In order to render Test B truly comparable, the annular width 25 of the ozonation chamber had to be reduced for Test B when compared to Test A, which explains the different inner diameters of the outer electrodes 14 for Tests A and B, respectively. For Test B, a homogeneous annular width 25 of 0.095 inch was chosen, equalling the mean net width of the discharge volume within which the ozonization takes place in the case of Test A, this net width varying between zero and essentially half the diameter of the spheres 40 due to placing the spheres 40 inside the discharge space 24. In order to further substantiate the validity of the selection of these dimensions, experiments were conducted with different annular widths 25 for Test series B, and with different diameters of spheres 40 for Test series A. The selection of the parameters reported here and used for the Tests A and B emerged as optimum for the two types of test series.

The tests were conducted with a mass flow rate of 30 scfh of dry air at essentially atmospheric pressure. The results are summarized in Table 1. Stars (*) denote the maximum voltage operating conditions for continuous duty operation; values in parenthesis () indicate maximum voltage operating conditions beyond which overheating and failure may occur.

TABLE 1

| Applied Tube Voltage | Ozone Mass Flow (grams/hour) | | Power Consumption (Watts) | | Efficiency (grams/kWh) | |
| --- | --- | --- | --- | --- | --- | --- |
| | Test A | Test B | Test A | Test B | Test A | Test B |
| 4000 V | n/m | 0.303 | n/m | 8.7 | n/m | 35 |
| 4500 V | 1.85 | 1.21 | 27.5 | 22.4 | 67 | 54 |
| 5000 V | 2.11 | 1.82* | 34.8 | 36.0* | 61 | 51* |
| 5500 V | 2.38 | (2.27) | 43.4 | (59.5) | 55 | (38) |
| 6000 V | 2.62 | — | 52.5 | — | 50 | — |
| 6500 V | 3.02 | — | 62.8 | — | 48 | — |
| 7000 V | 3.33* | — | 74.8* | — | 45* | — |
| 7500 V | (3.59) | — | (89.9) | — | (40) | — |

The results indicate that, in this representative test series, the use of the cooling means (spheres 40, Test A) improves the maximum ozone production rate under continuous duty operation by 83 percent (from 1.82 g/h to 3.33 g/h). The maximum power input that can be used for continuous duty operation is improved by 108 percent (from 36W to 74.8W), and the ozone production energy efficiency (measured for constant ozone output, such as 1.8 g/h) is improved by 31 percent (from 51 to 67 grams per kWh). Temperature measurements made on the outer surface of the dielectric 16 indicated that the temperature of the dielectric was decreased in Test A when compared to Test B. At the respective maximum operating conditions (7500 V and 89.9W for Test A; 5500 V and 59.5W for Test B), the surface temperatures were roughly identical.

These tests indicate that an improvement of ozone production rate and of ozone production energy efficiency are found when the cooling means, as described in this invention, are applied. The ozone production rate is primarily proportional to the power that can be applied to the ozonator. This power is limited to the amount that can be tolerated until the dielectric fails due to overheating. The improved cooling means increases the power that can be tolerated until that failure limit is reached by over 100 percent. The ozone production energy efficiency is expected to be primarily, all other (geometric and electrical) factors of the ozonator being equal, a function of the wall temperatures in the ozonization chamber. At constant power input, the ozonator with the improved cooling means has cooler wall temperatures and, hence, increases the expected energy efficiency. The results indicate an improvement of over 30 percent.

Although the present invention has been described with reference to specific examples, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

It is claimed:

1. A corona discharge ozonator comprising:
   a first electrode;
   a second electrode concentric to and spaced from the first electrode, the first and second electrodes connectable to an electrical power source for operation of the ozonator;
   a dielectric material disposed between the electrodes, wherein a) the dielectric material and the first electrode or b) the dielectric material and the second electrode becoming hotter than the other during operation;
   an ozonization chamber formed between one of the electrodes and the dielectric material and defining a fluid flow path; and,
   means for transferring heat from the hotter to the cooler of the dielectric and the first or second electrode, the heat transfer means disposed within the ozonization chamber.

2. The ozonator as in claim 1 wherein the heat transfer means contacts the first or second electrode and the dielectric material at a plurality of points along the fluid flow path for transferring heat by direct conduction and convection.

3. The ozonator as in claim 1 wherein the second electrode includes cooling means for cooling the second electrode during operation, and the heat transfer means transfers heat from the dielectric material to the second electrode.

4. The ozonator as in claim 1 wherein the fluid flow path has a substantially uniform width, the width being transverse to the common axis of the electrodes.

5. The ozonator as in claim 4 wherein the heat transfer means includes a plurality of thermally conducting solids within the fluid flow path, substantially each of the solids touching another of the solids and either the dielectric material or the first or second electrode.

6. The ozonator as in claim 5 wherein the solids include spheres having a diameter smaller than the fluid flow path width.

7. The ozonator as in claim 6 wherein the spheres define a clearance within the fluid path, a ratio of the clearance and the fluid flow path width is about 0.1.

8. The ozonator as in claim 4 wherein the heat transfer means includes an axially extending corrugated metal sheet.

9. The ozonator as in claim 4 wherein the heat transfer means includes an axially extending metal spring.

10. The ozonator as in claim 2 wherein the heat transfer means contacts the first electrode, the second electrode or the dielectric material in at least 10 points per square inch along the fluid flow path.

* * * * *